US006330504B1

(12) United States Patent
Toukura et al.

(10) Patent No.: US 6,330,504 B1
(45) Date of Patent: Dec. 11, 2001

(54) VEHICLE DRIVING FORCE CONTROL WITH OPERATOR POWER DEMAND RESPONSIVE CORRECTION

(75) Inventors: Nobusuke Toukura; Mikio Nozaki, both of Kanagawa; Daisuke Yoshinoya; Masayuki Yasuoka, both of Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/547,884

(22) Filed: Apr. 12, 2000

(30) Foreign Application Priority Data

Apr. 12, 1999  (JP) .................................................. 11-103693

(51) Int. Cl.[7] .................................................. F02D 29/02
(52) U.S. Cl. .............................................. 701/54; 477/107
(58) Field of Search .................................. 701/54, 93, 94; 180/170; 477/107

(56) References Cited

U.S. PATENT DOCUMENTS

| 5,465,208 | * | 11/1995 | Mochizuki et al. | ............ 364/426.01 |
| 5,557,519 | * | 9/1996 | Morita | .............................. 364/424.01 |
| 5,728,026 | * | 3/1998 | Sakaguchi et al. | ................... 479/110 |
| 5,832,400 | * | 11/1998 | Takahashi et al. | ...................... 701/53 |
| 6,106,434 | * | 8/2000 | Ibamoto et al. | ...................... 477/120 |
| 6,169,949 | * | 1/2001 | Sato | ...................... 701/51 |

FOREIGN PATENT DOCUMENTS

| 6-88541 | 3/1994 | (JP) . |
| 10-266882 | 10/1998 | (JP) . |

* cited by examiner

*Primary Examiner*—William A. Cuchlinski, Jr.
*Assistant Examiner*—Eric M Gibson
(74) *Attorney, Agent, or Firm*—Foley & Lardner

(57) ABSTRACT

A driving force control system is provided for an automotive vehicle powertrain. The driving force control system has an accelerator pedal sensor to detect the vehicle's operator depression of an accelerator pedal of the vehicle, a vehicle speed sensor to detect a vehicle speed of the vehicle, and a powertrain control module. The powertrain control modules includes a microprocessor to determine an ordinary target driving force in response to the vehicle's operator depression of the accelerator pedal and the vehicle speed, to determine a running resistance increment, to determine a driving force correction in response to the vehicle's operator depression and the driving force correction, and to determine a corrected target driving force after correcting the ordinary target driving force with the driving force correction.

17 Claims, 10 Drawing Sheets

$$\tan\theta = \left(\frac{htSE-htSW+htNE-htNW}{2\times LEN}\right) \times \cos\xi$$
$$+ \left(\frac{htNW-htSW+htNE-htSE}{2\times LEN}\right) \times \sin\xi$$

VEHICLE DRIVING FORCE CONTROL WITH OPERATOR POWER DEMAND RESPONSIVE CORRECTION

FIELD OF THE INVENTION

The present invention relates to a driving force control for an automotive vehicle.

BACKGROUND OF THE INVENTION

The term "standard resistance" or "standard running resistance" is herein used to mean any force which opposes the motion of an automotive vehicle which is driven to keep on rolling over the surface of a flat road having 0% gradient at a constant vehicle speed. The term "running resistance" is herein used to mean any force that opposes the motion of an automotive vehicle, which is driven to keep on rolling over the surface of a road at a constant vehicle speed. Running resistance is equal to standard resistance if an automotive vehicle is driven to keep on rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

JP-A 6-88541 discloses a driving force control system for an automotive vehicle having an engine with an electronically controlled throttle and an automatic transmission. According to this known control system, a target driving torque is determined against current accelerator pedal opening and vehicle speed. First and second throttle opening degrees are calculated. The first throttle opening degree is a function of the target driving torque. The second throttle opening degree is proportional to the accelerator pedal opening degree. The first and second throttle opening degrees are combined to give a combined throttle opening degree. The combined throttle opening degree is applied to an electronically controlled throttle. A proportion of the first and second throttle opening degrees reflected in the lo combined throttle opening degree is determined in response to the accelerator opening degree.

A target engine output torque is determined which accomplishes the corrected target driving force. Over a range of manipulation or opening degree of the vehicle accelerator from zero percent to around fifty percent, the opening degree of the electronically controlled throttle valve is adjusted to accomplish a target driving torque that has been determined as a function of the corrected target driving force. Over a range from around fifty percent to one hundred percent, the opening degree of the throttle is determined as a linear function of the opening degree of the accelerator. This measure is intended to give the vehicle operator acceleration feel fit to the operator's demand.

JP-A 10-266882 discloses an attempt to smooth variation in driving force during operation with small values of accelerator pedal opening degree by referring to a plurality of maps stored against varying values of accelerator pedal opening degree, respectively. Each map contains varying values of target driving force against varying values of vehicle speed. For operation with small values of accelerator pedal opening, a map selected against one value of the accelerator pedal opening and the adjacent map selectable against another value of the accelerator pedal opening that is to be reached upon slightly depressing the accelerator pedal contain two different values of target driving force with a small difference.

SUMMARY OF THE INVENTION

U.S. patent application Ser. No. 09/518,691, filed Mar. 3, 2000, entitled "Driving Force Control With Gradient Resistance Torque Dependent Correction Factor" is pending and has been assigned to the same assignee to which the present application is to be assigned. This United States Patent Application claims priority based on Japanese Patent Application No. 11-58289 filed in Japan on Mar. 5, 1999. This United States Patent Application, which is hereby incorporated by reference in its entirety, has a corresponding European Patent Application that claims priority based on Japanese Patent Application No. 11-58289.

This United States Patent Application has proposed a driving force control system that includes an ordinary target driving force generator that generates an ordinary target driving force (tTd#n), and a running resistance increment generator that generates a running resistance increment (RESTRQ). The ordinary target driving force (tTd#n) is given after retrieving a map using accelerator pedal opening (APO) that is equivalent to operator's depression of the vehicle's accelerator pedal and vehicle speed (VSP). Referring to FIGS. 5 and 10, one dot chain line curve illustrates the variation of ordinary target driving force (tTd#n) when the vehicle operator depresses the vehicle's accelerator pedal from the released position. The proposed driving system further includes a driving force correction generator that determines a driving force correction (ADDFD) in response to the running resistance increment (RESTRQ), and a corrected target driving force generator where the driving force correction (ADDFD) is added to the ordinary target driving force (tTd#n) to produce a corrected target driving force driving force (tTd). This corrected target driving force (tTd) is used to determine a target engine torque (tTe) and a target CVT ratio (tRATIO). The fully drawn curve in FIG. 10 or the broken line curve in FIG. 5 illustrate the variation of the corrected target driving force (tTd) when the vehicle operator depresses the vehicle's accelerator pedal from the released position under a condition where the running resistance increment (RESTRQ) is large enough to cause the driving force correction generator to provide a substantial amount of driving force correction (ADDFD).

In the proposed driving force control system, even when the accelerator pedal is slightly depressed from its released position, the engine is adjusted to produce engine torque needed to accomplish the corrected target driving force that has been given after addition of the driving force correction (ADDFD) to the ordinary target driving force (tTd#n). If the driving force correction (ADDFD) is not zero, occurrence of shocks due to a change in engine torque is unavoidable.

In FIG. 10, the reference character A represents an operation point when the accelerator pedal is released. At the operation point A, the driving force correction (ADDFD) is zero so that correction of the ordinary target driving force (tTd#n) is not carried out. If the accelerator pedal is slightly depressed from the released position by an amount α1, the driving force correction (ADDFD) becomes greater than zero so that the corrected driving force (tTd) jumps from the operation point A to an operation point B+, and then increases to an operation point C.

Accordingly, there occurs a rapid increase in driving force by ΔFd, causing a rapid increase in driving force from the operation point A, producing shocks.

During operation with the accelerator pedal released, suspension of fuel supply gains growing popularity in order to save fuel. If the ordinary target driving force (tTD#n) is corrected in response to a slight increase in depression of the vehicle's accelerator pedal from the released position where the fuel supply is suspended, a change in driving force grows substantially great in comparison with what is expected in response to the slight increase in depression of the accelerator pedal. This great change in driving force may cause the vehicle body to experience shocks and longitudinal vibration.

Subsequently, if the accelerator pedal is released from the slightly depressed position, where the driving force is corrected, to the released position, there is a shift from the operation point B+ to the operation point A viewing in FIG. 10. This shift causes a rapid drop in driving force by an amount ΔFd, causing occurrence of so-called "FF shock".

In view of the above-mentioned problem, an object of the present invention is to improve the proposed driving force control system such that the corrected target driving force is tamed to avoid occurrence of shocks when a vehicle's accelerator pedal is depressed from its released position.

According to the present invention, there is provided a driving force control system for an automotive vehicle powertrain including a prime mover and an automatic transmission, the driving force control system comprising:
- a first sensor to detect the vehicle's operator demand on driving force to drive the vehicle;
- a second sensor to detect a predetermined parameter vehicle speed of the vehicle; and
- a microprocessor that is programmed to be operative
- to determine a target value indicative of driving force in response to the vehicle's operator demand on driving force and the vehicle speed,
- to determine a running resistance increment,
- to determine a driving force correction in response to the vehicle's operator demand on driving force and the determined driving force correction, and
- to correct the determined target value with the determined driving force correction.

DESCRIPTION OF THE PREFERRED EMBODIMENTS

Figure 1:
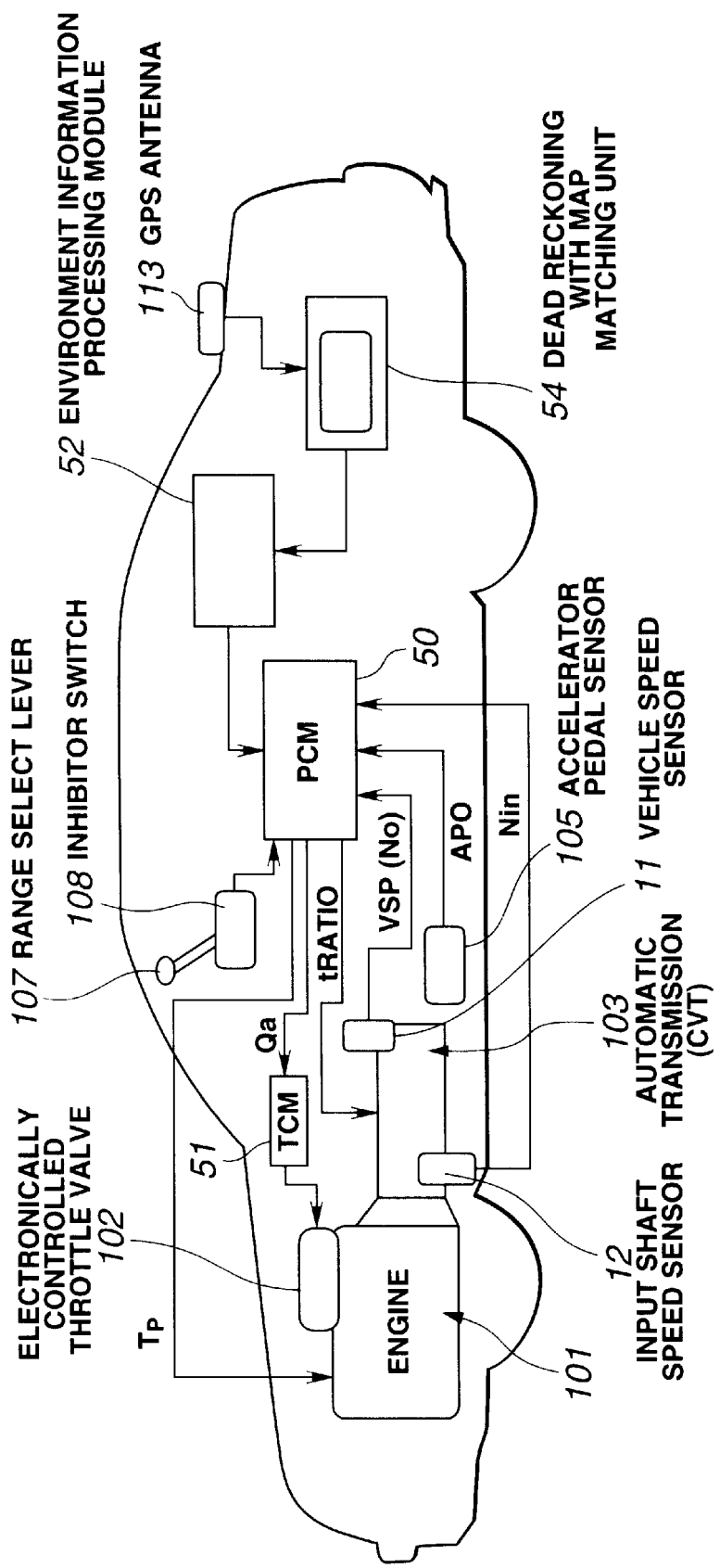
FIG. 1 is a block diagram of an automotive vehicle having driving wheels, a powertrain including an engine and an automatic transmission, and a powertrain control module (PCM).

Referring to the accompanying drawings, FIG. 1 is a schematic view of a passenger automobile installed with a driving force control system implementing the present invention.

The automobile has a powertrain including a prime mover in the form of an internal combustion engine 101 and an automatic transmission 103, and a powertrain control module (PCM) 50. Output from the engine 101 is transmitted via the automatic transmission 103 to driving wheels. The PCM 50 controls engine torque of the engine 101 and a speed ratio, a ratio between a transmission input shaft speed and a transmission output shaft speed, of the automatic transmission 103 in such a manner as to cause the powertrain to produce driving force desired.

An accelerator pedal position detector in the form of an accelerator pedal opening sensor 105 is operatively connected to a manually operable accelerator, such as for example, an accelerator pedal, to feed operator demand on driving force to the PCM 50. The accelerator pedal opening sensor 105 detects an accelerator position and generates an APO signal indicative of the detected accelerator position. This APO signal is fed as an input to the PCM 50. The vehicle operator depresses the accelerator pedal to express driving force demand. In this example, the APO signal is indicative of driving force demand, i.e., operator demand on driving force, and the accelerator pedal opening sensor 105 is a sensor to detect vehicle's operator demand on driving force. Naturally, any other form of sensor may be employed for this purpose. The automatic transmission 103 has a plurality of ranges that may be selected by a range select lever 107. An inhibitor switch 108 is operatively connected to the range select lever 107 to detect which range is being selected and generates a select signal indicative of the range being selected by the select lever 107. The select signal is fed as an input to the PCM 50. A vehicle speed sensor 11 detects a predetermined parameter indicative of the vehicle speed and generates a vehicle speed signal VSP. The vehicle speed sensor 11 may take any form as long as it could output signal indicative of the vehicle speed. The vehicle speed signal VSP is fed as an input to the PCM 50. A crankshaft angle sensor, not shown, generates an engine speed signal NRPM. The engine speed signal NRPM is fed as an input to the PCM 50.

Based on input signals including the above-mentioned input signals, the PCM 50 conducts adjustment of engine torque of the engine 101 and adjustment of the ratio within the automatic transmission 103 to produce driving torque transmitted to the driving wheels. The adjustment of engine torque may be made by varying one of or any combination of fuel injection quantity Tp, intake air flow rate Qa, and spark timing.

To adjust the intake air flow rate Qa, an electronically controlled throttle valve 102 is disposed in an intake passage of the engine 101. In response to a throttle valve opening command from the PCM 50, a throttle control module (TCM) adjusts the position of the throttle valve 102.

The automatic transmission 103 includes a continuously variable transmission (CVT) that can alter a ratio continuously in response to a ratio command from the PCM 50. The PCM 50 multiplies a predetermined constant with the vehicle speed VSP to give a transmission output shaft speed No. An input shaft speed sensor 12 detects revolution speed of the transmission input shaft and generates an input shaft speed signal Nin indicative of the detected speed of the transmission input shaft. The input shaft speed signal Nin is fed as input to the PCM 50. The PCM 50 calculates a ratio RATIO Nin/No and determines the ratio command and applies it to a ratio control mechanism of the CVT 103 to match a target ratio tRATIO that is determined by the PCM 50. The CVT may be of the V belt type or the toroidal type. Rotation of the output shaft of the automatic transmission 103 is transmitted via a final-drive to the vehicle driving wheels. The final-drive has a fixed ratio.

The PCM 50 is in the form of a microprocessor that includes a CPU, a ROM, a RAM, and an input/output device.

Figure 2:
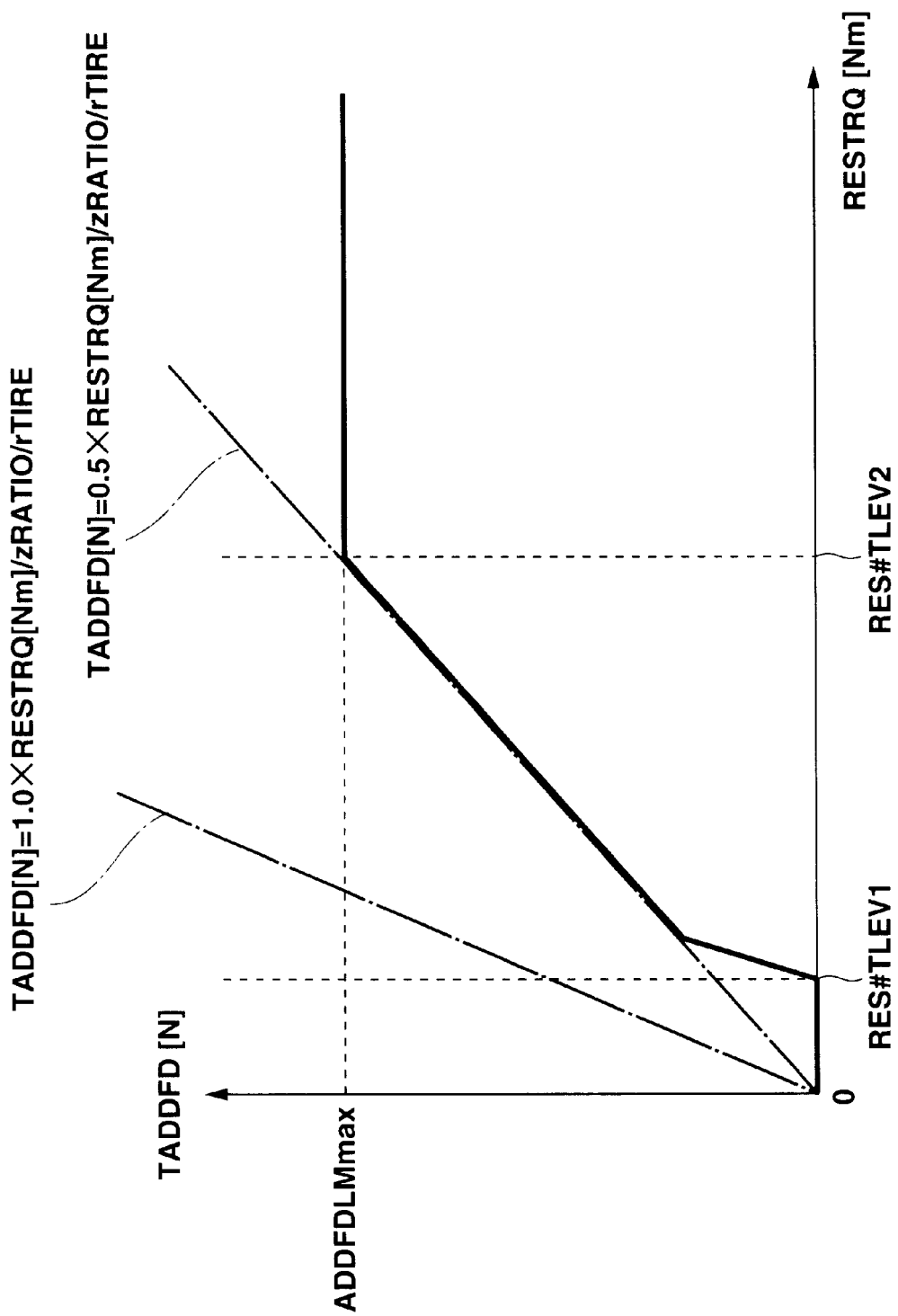
FIG. 2 is a control diagram, illustrating a first preferred implementation according to the present invention.

Referring now to FIG. 2, a description is made on driving force control carried out within the PCM 50.

FIG. 2 is a control block diagram of the driving force control. It includes an ordinary target driving force generator (OTDFG) 1, a running resistance increment generator (RRIG) 2, a preliminary driving force correction generator (PDFCG) 4, a corrected target driving force generator (CTDFG) 6, a target engine torque generator (TETG) 7, and a target ratio generator (TRG) 8. It also includes a limit criteria 3 and a select low switch 5.

The OTDFG 1 inputs APO and VSP. The OTDFG 1 includes a memory storing a predetermined tTd#n vs. (APO, VSP) map that defines various target values indicative of ordinary target driving force tTd#n at various values of VSP with various values of APO. Each target value tTd#n exhibits ordinary driving force needed to accomplish a desired traveling performance of a vehicle on a flat road having 0% gradient. The OTDFG 1 performs a table look-up operation of the map using APO and VSP to determine an ordinary target driving force tTd#n and provides the determined ordinary target driving force tTd#n to the CTDFG 6.

Thus, tTd#n can be expressed as $$tTd\#n = MAP\ [APO, VSP] \quad (1).$$

The RRIG 2 calculates an increase in running resistance from a standard value of running resistance to give a running resistance increment RESTRQ. The running resistance increment RESTRQ is indicative of a value resulting from converting the increment of running resistance force to the increment of resistance torque transmitted to the transmission output shaft. The PDFCG 6 inputs RESTRQ and determines a preliminary driving force correction TADDFD.

The RRIG 2 includes a driving torque generator (DTG) 21, a standard running resistance generator (SRRG) 22, and an acceleration resistance generator (ARG) 23.

The DTG 21 inputs Tp and NRPM. The DTG 21 includes a memory storing a predetermined ENGTRQ vs., (Tp, NRPM) map that defines various values of engine torque to be produced by the engine 101 against various combinations of values of Tp and values of NRPM. The DTG 21 performs a table look-up operation of this map using Tp and NRPM to determine an engine torque ENGTRQ. It multiplies the determined ENGTRQ with a current speed ratio RATIO established within the CVT 103 and a torque transmission ratio τ RATIO established within a torque converter to give an driving torque TRQOUT transmitted to the transmission output shaft.

The driving torque TRQOUT can be expressed as $$TRQOUT = ENGTRQ \times RATIO \times \tau\ RATIO \quad (2).$$

The SRRG 22 inputs VSP. The SRG B22 includes a memory storing a predetermined RLDTRQ vs., VSP map that defines various value of standard running resistance RLDTRQ against various values VSP. The standard running resistance RLDTRQ is indicative of a value resulting from converting the standard running resistance force to the resistance torque transmitted to the transmission output shaft.

The standard running resistance RLDTRQ can be expressed as $$RLDTRQ = MAP\ [VSP] \quad (3).$$

The ARG 23 inputs vehicle acceleration GDATA [m/s$^2$] that is derived as the first time derivative of VSP or as a measure of an accelerometer. Vehicle weight WV, tire radius rTIRE [m] and inverse of final reduction ratio zRATIO are stored as reference data in the ARG 23. The ARG 23 determines an acceleration resistance GTRQ as a product of GDATA, WV, rTIRE, and zRATIO as expressed as $$GTRQ = GDATA \times WV \times rTIRE \times ZRATIO \quad (4).$$

Using the equation (4), the vehicle acceleration GDATA is converted to the acceleration resistance torque of the transmission output shaft.

The RRIG 20 calculates a sum RLDTRQ and GTRQ and subtracts the sum from TRQOUT to give the running resistance increment RESTRQ. The RRIG 20 provides RESTRQ to the PDFCG 4.

The running resistance increment RESTRQ can be expressed as $$RESTRQ = TRQOUT - (RLDTRQ + GTRQ) \quad (5).$$

Figure 3:
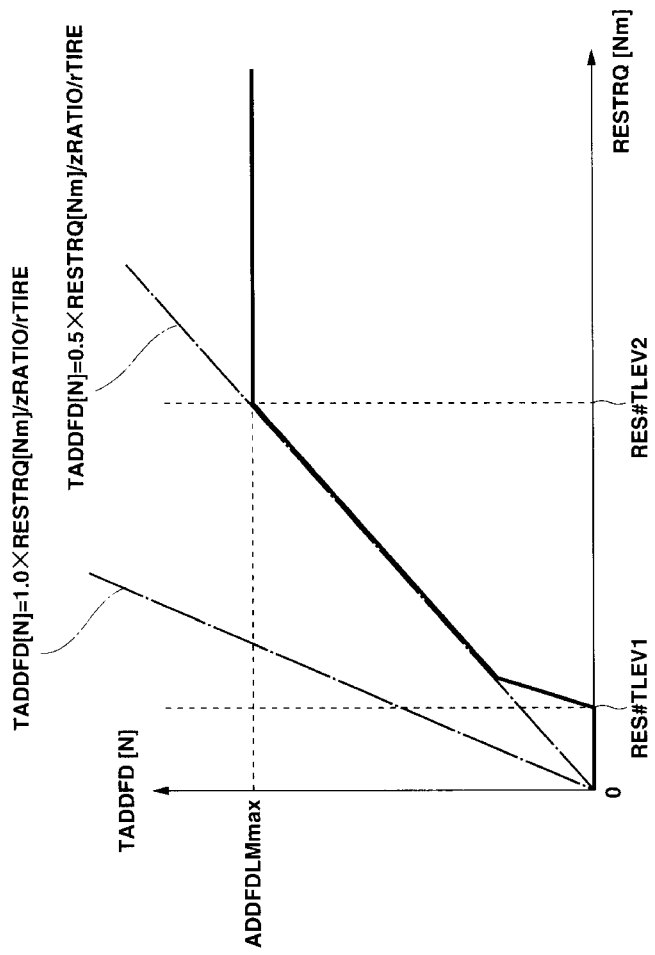
FIG. 3 is a graphical representation of characteristic of variation of a preliminary driving force correction (TADDFD) against variation of an increment in running resistance (RESTRQ).

The PDFCG 4 includes a memory storing a predetermined TADDFD vs., RESTRQ map as illustrated by the fully drawn line in FIG. 3 and performs a table look-up operation of the stored map using RESTRQ to determine a preliminary driving force correction TADDFD.

The preliminary driving force correction TADDFD, which is expressed in terms of the same dimension [N] as the target value tTd#n, is set less than a value resulting from converting RESTRQ to running resistance force. This relation can be expressed as $$TADDFD < RESTRQ/zRATIO/rTIRE \quad (6).$$

This exhibits that TADDFD is always less than 100% of the converted value from RESTRQ.

Figure 4:
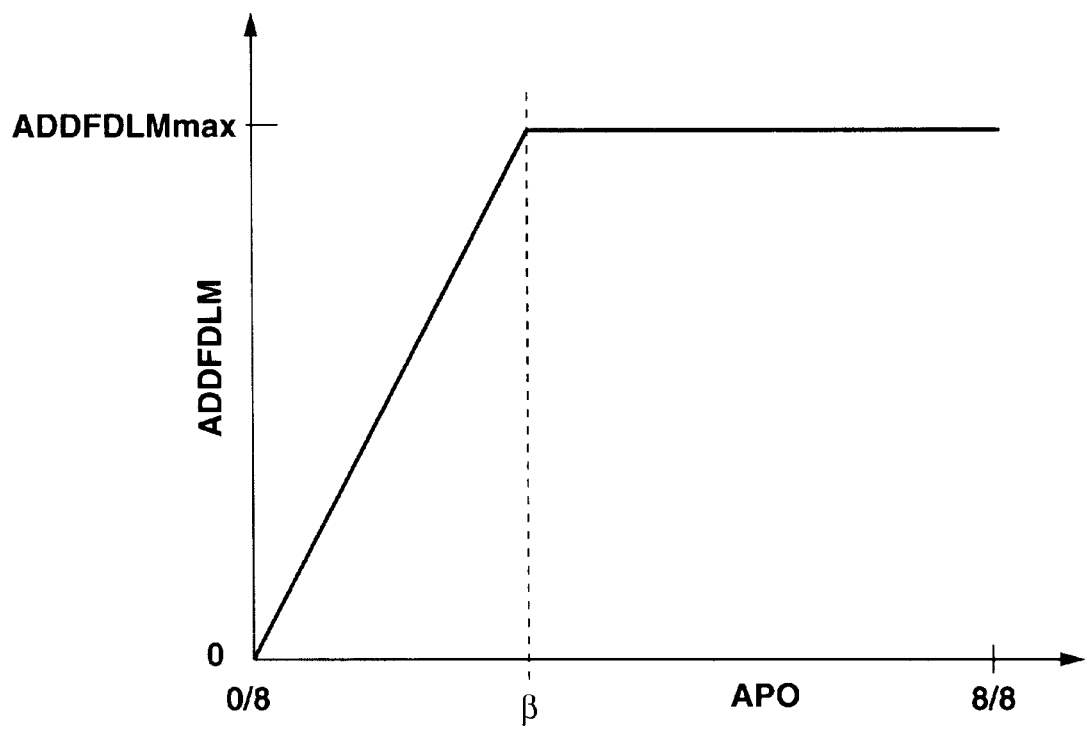
FIG. 4 is a graphical representation of characteristic of variation of limit criteria (ADDFDLM) against variation of an accelerator pedal opening (APO).

The limit criteria 3 include a memory storing a predetermined map as illustrated by the fully drawn line in FIG. 4. This map defines values of a driving force correction upper limit ADDFDLM against values of APO. At the limit criteria 3, ADDFDLM is determined which corresponds to APO.

When the accelerator pedal is released and APO=0, ADDFDLM=0 holds. As APO increases from zero, ADDFDLM increases from zero increases.

The limit criteria 3 provide ADDFDLM to the select low switch 5. The PDFCG 4 provides TADDFD to the select low switch 5. The select low switch 5 outputs a lower one of ADDFDLM and TADDFD as a driving force correction ADDFD. The select low switch 5 provides ADDFD to the CTDFG 6.

The CTDFG 6 adds ADDFD to tTd#n to give a target driving force tTd. The target driving force tTd can be expressed as $$tTd = tTd\#n + ADDFD \tag{7}$$

The CTDFG 6 provides tTd to a target engine torque generator (TETG) 7 and also to a target ratio generator (TRG) 8.

The TETG 7 receives RATIO, rTIRE, and zRATIO as well as tTd and determines a target engine torque tTe after calculating the following equation:

$$tTe = tTd \times rTIRE \times ZRATIO \div RATIO \tag{8}$$

The TETG 7 provides tTe to the engine 101. In order to realize tTe, the TCM 51 determines the position of the electronically controlled throttle valve 102, a control section of the engine 101 determines Tp and spark timing.

The TRG 8 receives VSP as well as tTd and determines a target speed ratio tRATIO using VSP and tTd. The TRG 8 has a memory storing a predetermined tRATIO vs., (tTd, VSP) map that defines various values of tRATIO against various combinations of values of VSP and values of tTd. In determining tRATIO, the TRG 8 performs a table look-up operation of this predetermined map using VSP and tTd. The TRG 8 provides tRATIO to a ratio control mechanism of the CVT 103. The ratio control mechanism adjusts RATIO within the CVT 103 to tRATIO.

FIG. 3 illustrates the TADDFD vs., RESTRQ map that is stored in the PDFCG 4. TADDFD is set against RESTRQ and used to compensate for a shortage in acceleration.

The fully drawn interconnected line segments shown in FIG. 3 illustrate the TADDFD vs., RESTRQ map used in the PDFCG 4.

Over values of RESTRQ not greater than a first predetermined value RES#TLEV1, zero is set as TADDFD. During operation of the vehicle when the variation of RESTRQ is less than or equal to the first predetermined value RES#TLEV1 and thus small, TADDFD is zero, thus preventing occurrence of any unexpected driving force correction due to, for example, an error in calculating RESTRQ, a small variation in wind against the vehicle or a small variation in running resistance derived from a gradual gradient change.

Thus, if $0 \leq RESTRQ < RES\#TLEV1$, then TADDFD=0.

Next, over values of RESTRQ greater than RES#TLEV1 but not greater than a second predetermined value RES#TLEV2, TADDFD can be expressed as $$TADDFD = 0.5 \times RESTRQ / zRATIO / rTIRE \tag{9}$$

In this equation, RESTRQ is divided by zRATIO to give torque on the driving wheel shaft, and this torque is divided by the tire radius rTIRE to convert the dimension from torque [Nm] to force [N], and 50% of the force given by this conversion is set as TADDFD. This percentage is not limited to 50% and may take an appropriate value less than 100%. The remaining portion of RESTRQ left unconverted is not translated into TADDFD, leaving a room for the vehicle operator to participate the driving force correction by depressing the accelerator pedal, thus providing a natural acceleration fit to the vehicle operator's demand.

Thus, if $RES\#TLEV1 \leq RESTRQ \leq RES\#TLEV2$, then $TADDFD = 0.5 \times RESTRQ / zRATIO / rTIRE$.

Over values of RESTRQ greater than RES#TLEV2, TADDFD is kept at a predetermined value ADDFDLMmax.

Thus, if RESTRQ>RES#TLEV2, then TADDFD=ADDFDLMmax.

During operation with RESTRQ greater than RES#TLEV2, the amount in driving force to be added to tTd#n is limited to ADDFDLMmax, thus preventing excessive acceleration. The value ADDFDLMmax is the maximum value that may be determined at the limit criteria 3 (see FIG. 4).

FIG. 4 illustrates an ADDFDLM vs., APO map used at the limit criteria 3.

The driving force correction amount upper limit ADDFDLM increases linearly against APO from zero to the maximum ADDFGLMmax. If the accelerator pedal is released and thus APO=0, then ADDFDLM=0. This causes ADDFD that is to be added to ttTd#n to increase from 0 as the accelerator pedal is depressed from the release position.

Over values of APO from 0 to a predetermined intermediate value β, ADDFDLM increases an a predetermined ramp rate as APO increases from 0 to the predetermined value β. The predetermined value β is 3/8 or 4/8 if the maximum of APO is 8/8.

The select low switch 5 selects a lower one of TADDFD and ADDFDLM to give the result as ADDFD. The select low switch 5 provides the ADDFD to the CTDFG 6. At the CTDFG 6, the ADDFD is added to tTd#n.

Figure 5:
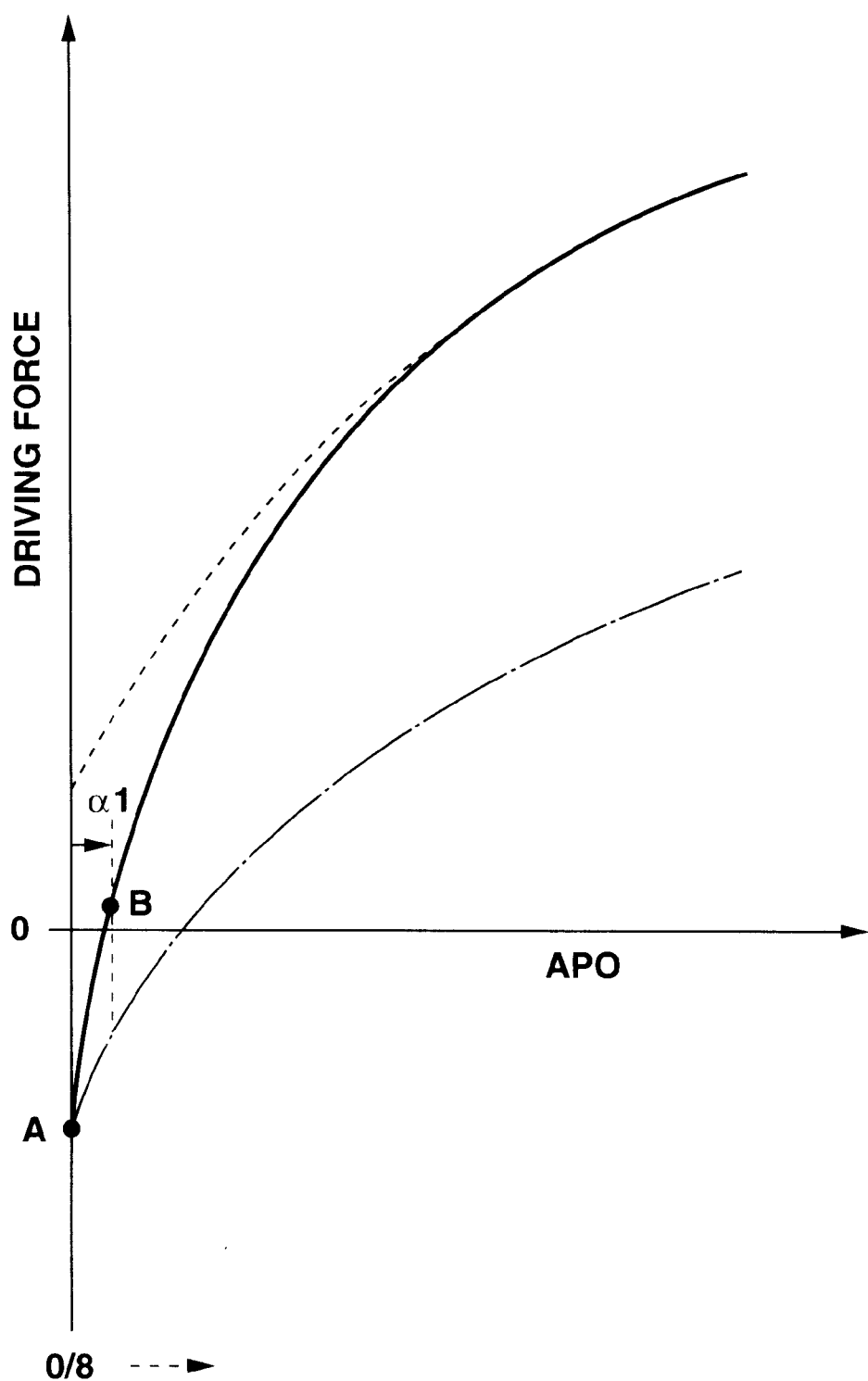
FIG. 5 is a graphical representation of characteristic of variation of driving force against variation of APO.

Let us now assume the case where RESTRQ exceeds RES#TLEV1 (see FIG. 3) so that TADDFD has a substantial value greater than zero. If, under this condition, the accelerator pedal is depressed from the released position, TADDFD will not be added to tTd#n. Instead, ADDFDLM that gradually increases from zero (see FIG. 4) is added to tTd#n. Referring to FIG. 5, if the accelerator pedal is depressed by a small amount α from the released position, the driving force gradually increases along the fully drawn curve (see FIG. 5) from operation point A to operation point B.

Accordingly, ADDFD gradually increases along the ramp of TADDFD as the accelerator pedal is depressed from the released position. This provides a smooth acceleration without any shock imparted to the vehicle body, resulting in enhancement of drivability.

If, subsequently, $ADDFDLM \geq TADDFD$, the select low switch 5 sets TADDFD as ADDFD. Accordingly, the correction of the tTd#n is made to produce acceleration high enough to meet RESTRQ with good accuracy.

Figure 6:
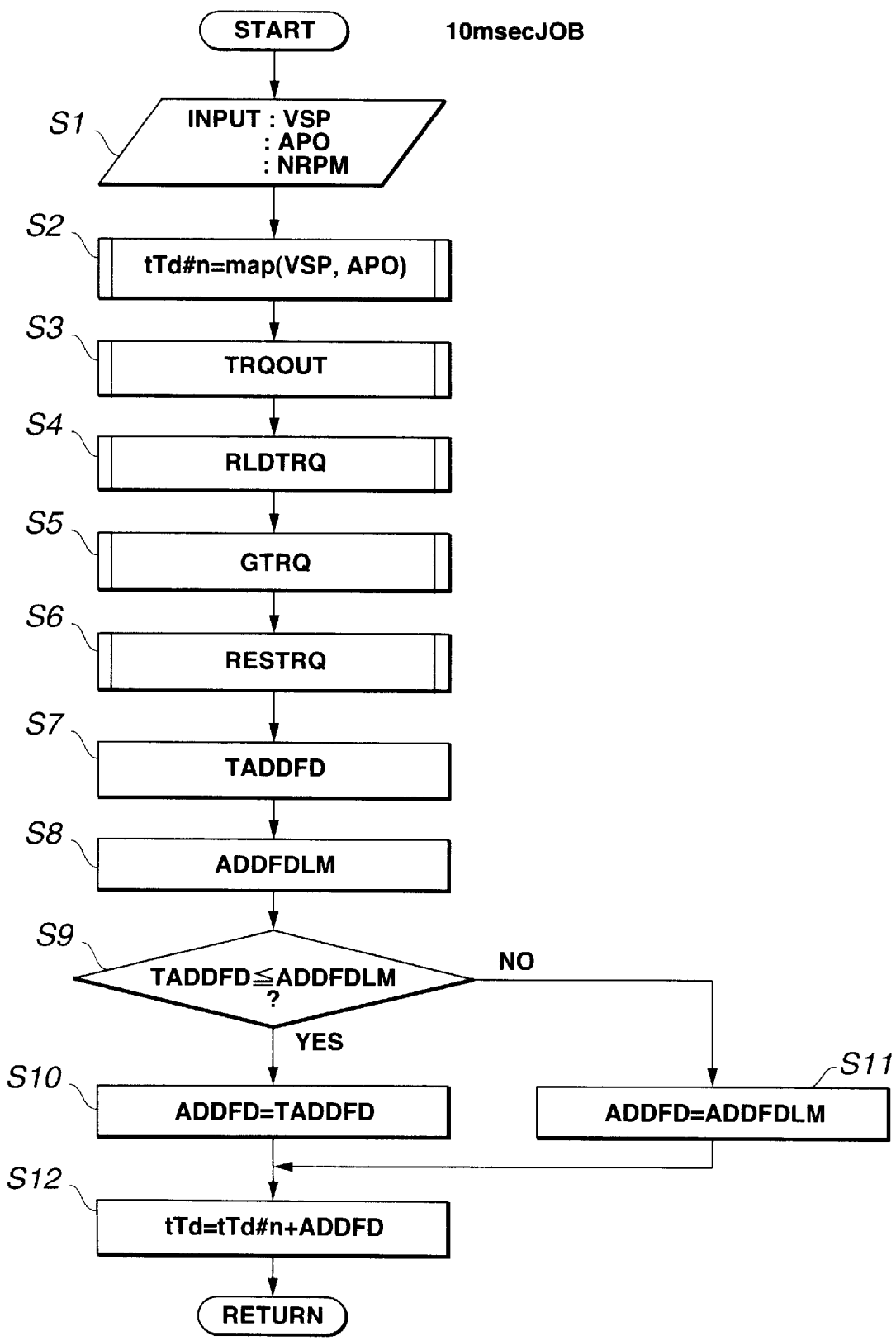
FIG. 6 is a flow chart of a control routine implementing the present invention.

FIG. 6 is a flow chart of a control routine implementing the present invention. The control routine is stored in the ROM of the microprocessor that forms the PCM 50.

At step S1, the CPU inputs VSP, APO, and NRPN.

At step S2, the CPU determines tTd#n by performing a table look-up operation, using APO and VSP, of the tTd#n vs., (APO, VSP) map illustrated in FIG. 2.

At step S3, the controller 3 determines ENGTRQ by performing a table look-up operation, using TP and NRPN, of the ENGTRQ vs., (Tp, NRPM) map illustrated in FIG. 2 calculates a product of ENGTRQ, RATIO, and τRATIO to give TRQOUT.

At step S4, the CPU determines RLDTRQ by performing a table look-up operation, using VSP, of the RLDTRQ vs., VSP map illustrated in FIG. 2.

At step S5, the CPU determines GTRQ after calculating a product of GDA TA, WV, rTIRE, and zRATIO.

At step S6, the CPU determines RESTRQ after subtracting (RLDTRQ+GTRQ) from TRQOUT.

At step S7, the CPU determines TADDFD by performing a table look-up operation, using RESTRQ, of the TADDFD vs., RESTRQ map illustrated in FIG. 3.

At step S8, the CPU determines ADDFDLM by performing a table look-up operation, using APO, of the ADDFDLM vs., APO map illustrated in FIG. 4.

At step S9, the CPU determines whether or not TADDFD≦ADDFDLM. If this is the case, the routine proceeds to step S10.

If this is not the case, the routine proceeds to step S11.

At step S10, the CPU sets TADDFD as ADDFD. At step S11, the CPU sets ADDFDLM as ADDFD.

At step S12, the CPU determines tTd by adding ADDFD to tTd#n.

The target driving force tTd thus determined as explained above is fed to the TETG 7 and also to TRG 8.

Figure 7:
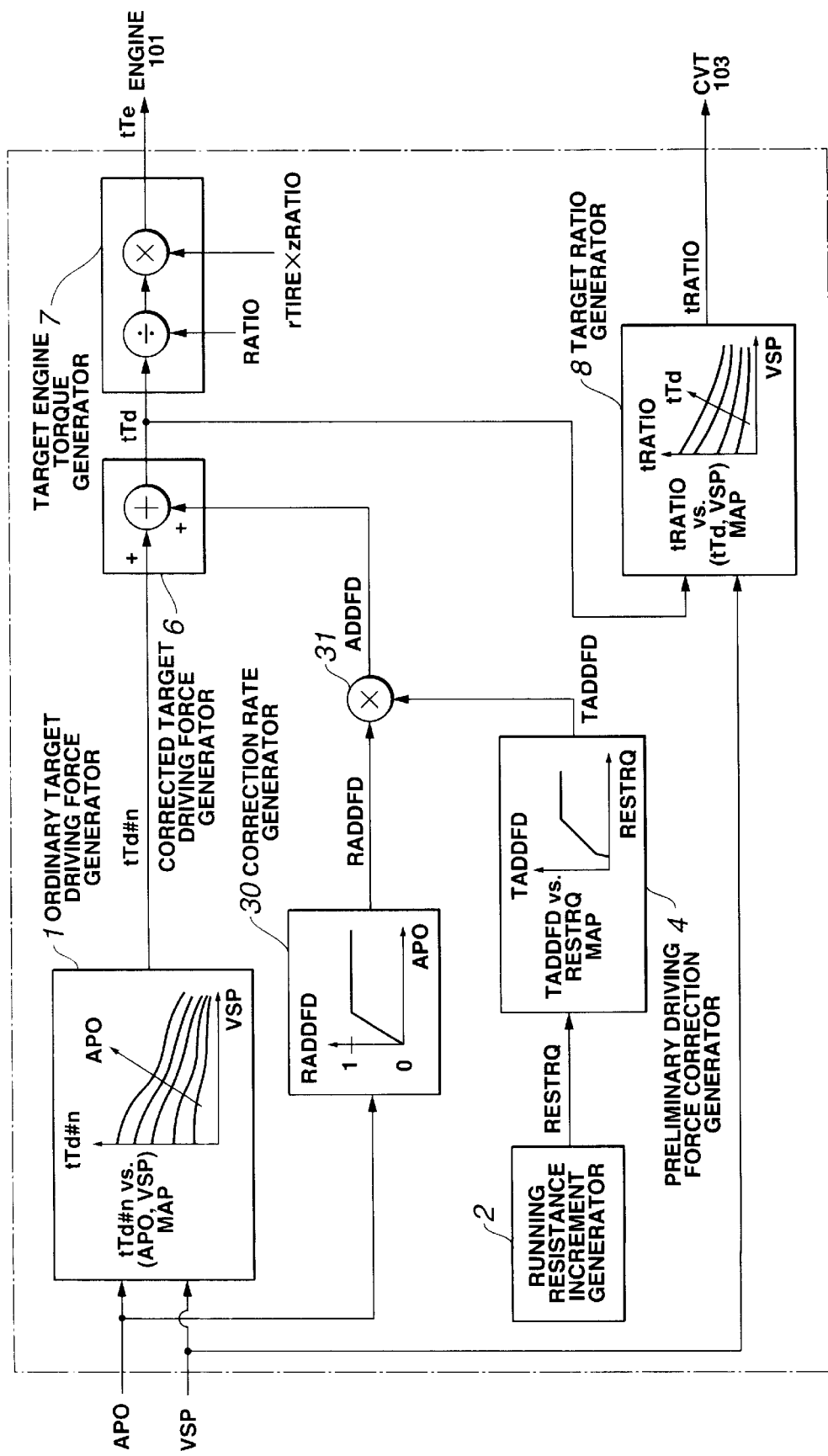
FIG. 7 is a control diagram illustrating a second preferred implementation according to the present invention.

FIG. 7 illustrates a second preferred implementation according to the present invention.

The second preferred implementation is substantially the same as the first preferred implementation except the provision of a correction rate generator (CRG) 30 and a multiplier 31 instead of the limit criteria 3 and select low switch 5 (see FIG. 2).

The CRG 30 determines a correction rate RADDFD against APO. RADDFD may take a value falling in a range as follows:

$$0 \leq RADDFD \leq 1.$$

If APO=0, then RADDFD=0. If APO≧β, then RADDFD=1.

If APO increases between 0 and β, RADDFD gradually increases from 0 toward 1.

The multiplier 31 calculates a product of RADDFD and TADDFD to give ADDFD. The ADDFD determined by the multiplier 31 is fed to a CTDFG 6. At the CTDFG 6, the ADDFD is added to tTd#n to give tTd.

Let us again assume the case where RESTRQ exceeds RES#TLEV1 (see FIG. 3) so that TADDFD has a substantial value greater than zero. If, under this condition, the accelerator pedal is depressed from the released position, TADDFD will not be added to tTd#n. Instead, ADDFD that gradually increases from zero (see FIG. 4) is added to tTd#n until RADDFD becomes equal to 1.

If, subsequently, RADDFD=1, then ADDFD=TADDFD.

Accordingly, the correction of the tTd#n is made to produce acceleration high enough to meet RESTRQ with good accuracy.

Figure 8:
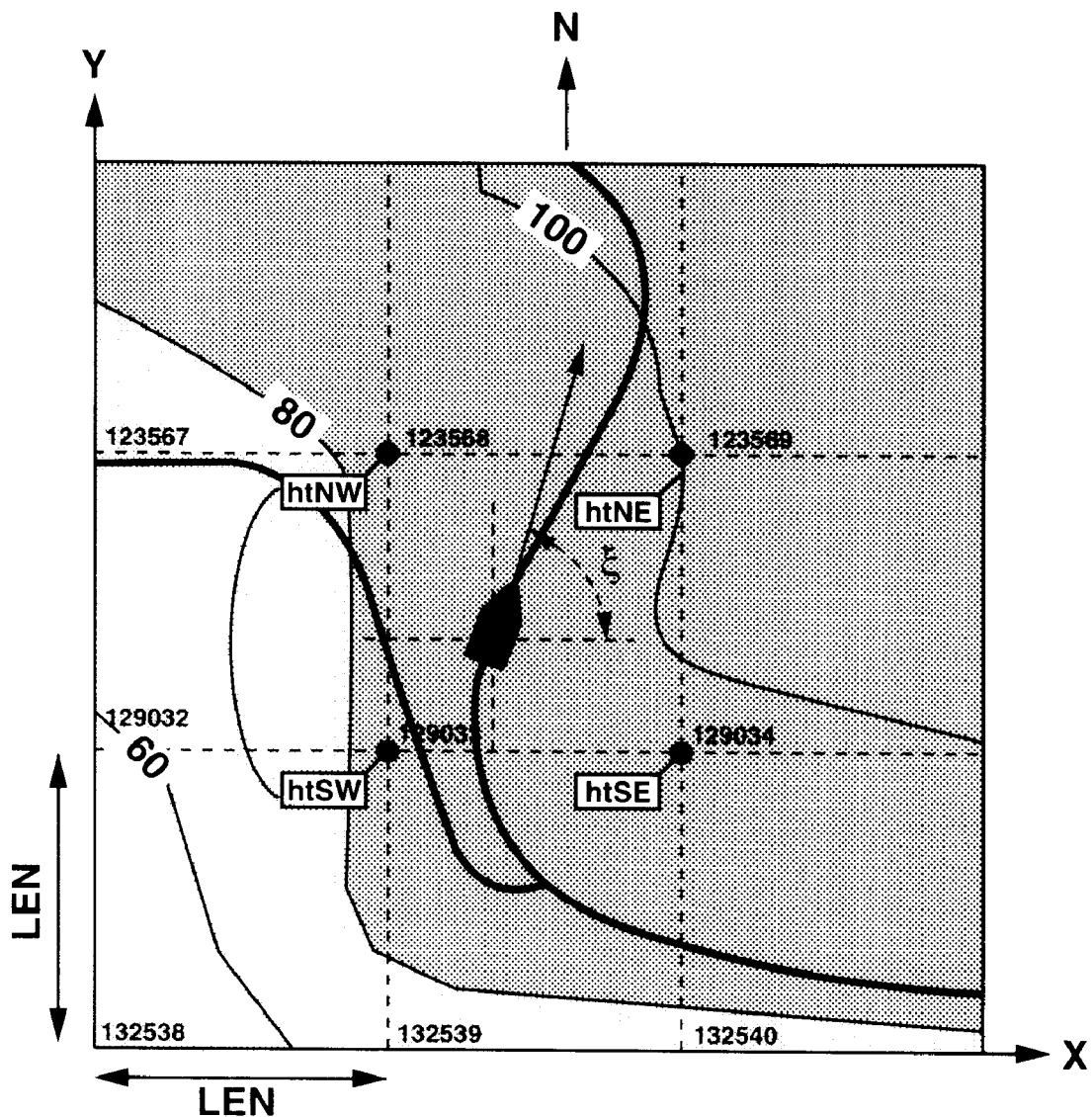
FIG. 8 is a schematic view of a digitized map, illustrating further preferred implementation according to the present invention.
Figure 9:
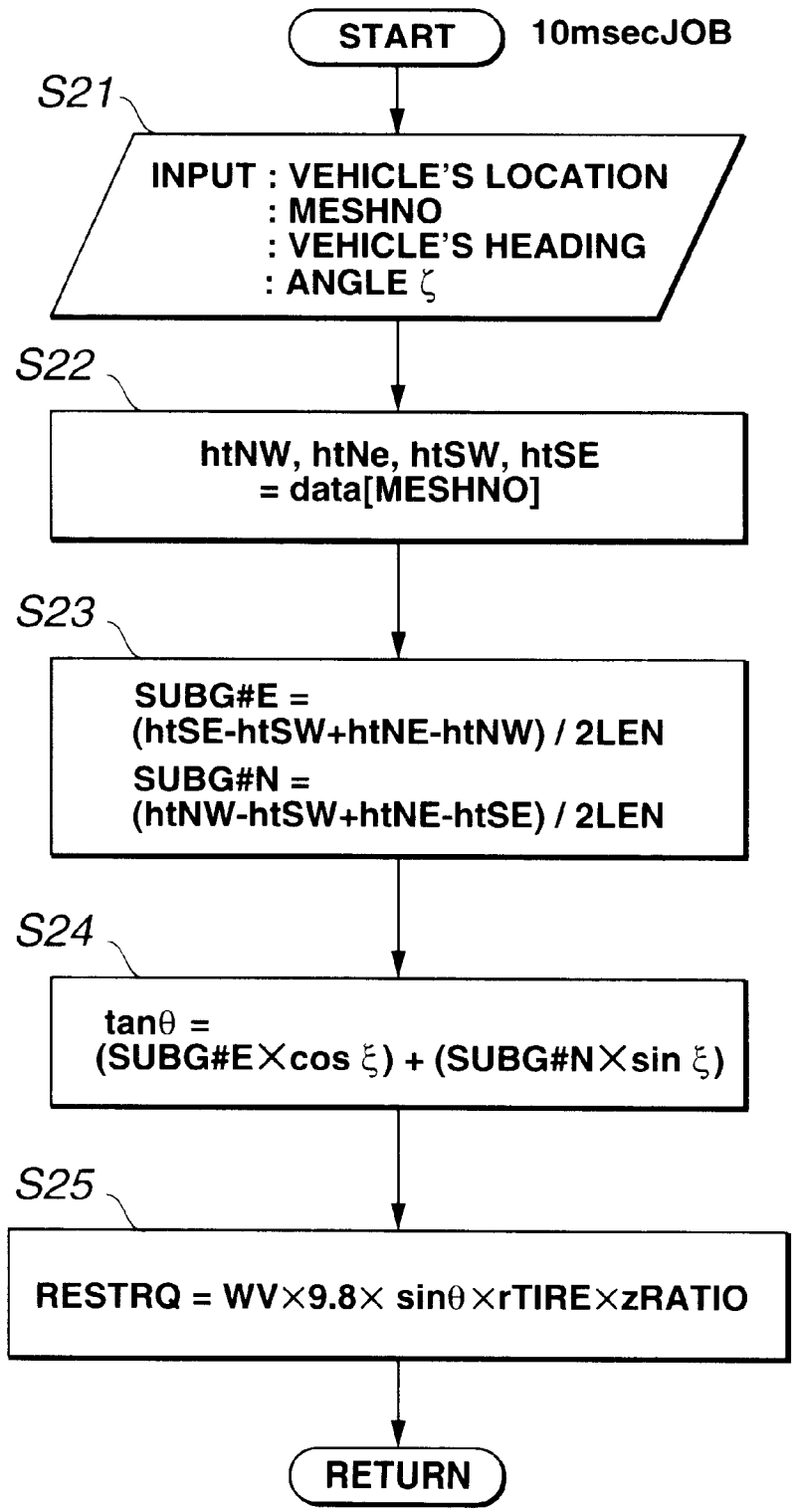
FIG. 9 is a flow chart of a control routine implementing the present invention.
Figure 10:
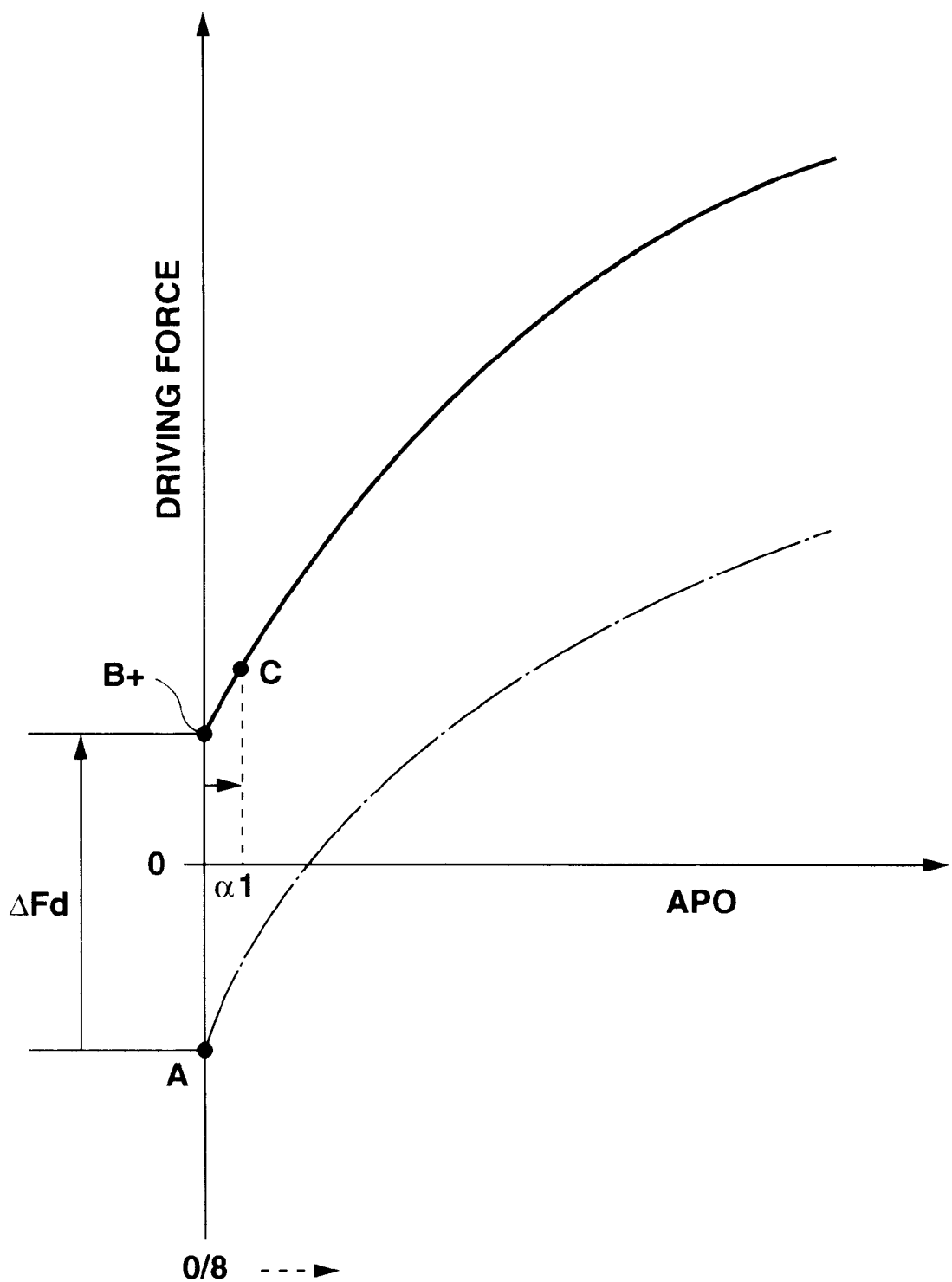
FIG. 10 illustrates, by the one-dot chain line, a curve that represents variation of the ordinary target driving force versus variation of APO, and by the fully drawn line, a curve that represents variation of corrected target driving force versus variation of APO according to the previously proposed driving control system.

Referring to FIGS. 1, 8, and 9, a description is made on a third preferred implementation according to the present invention.

The third preferred implementation is substantially the same as the first or second preferred implementation except the manner of determining RESTRQ. According to this preferred implementation, road gradient θ is estimated based on digital road maps.

Referring to FIG. 1, a GPS antenna 113 is integrated with a dead reckoning with map matching unit 54 for automobile navigation. Digital road maps containing topographical information are stored in an appropriate recording medium, such as, CD-ROM or DVD-ROM, in the unit 54. The unit 54 transmits position and topographical information to an environment information processing module (EIPM) 52. The EIPM 52 determines road gradient θ based on the position and topographical information and calculates based on the road gradient θ to determine RESTRQ. The determined RESTRQ is fed to a PDFCG 4 in a similar manner to FIG. 2 or 7.

FIG. 9 is a flow chart of a control routine implementing the present invention to determine RESTRQ.

At step S21, the CPU of the EIPM 52 inputs a vehicle's location, mesh numbers MESHNO of nodes of a current enclosed area around the vehicle's location, the vehicle's heading, and an angle ζ of direction of travel with respect to an X-axis direction intersecting the vehicle.

FIG. 8 shows a portion of an image of a digital map in which each of enclosed areas is determined by an X-Y grid. X-axis extends from west to east, and Y-axis extends from south to north. In the illustrated example, the vehicle's location is within an enclosed square area having four nodes NW, NE, SE, and SW identified by mesh numbers 123568, 123569, 129034, and 129033, respectively. The X-Y coordinates of the node points are included in a database along with altitude data at the node points. For example, the four nodes NW, NE, SE, and SW have altitude data htNW, htNE, htSE, and htSW, respectively. LEN represents a length of each of line segments surrounding one of enclosed areas and interconnecting nodes.

At step S22, the CPU inputs altitude data htNW, htNE, htSE, and htSW of the vicinity nodes identified by the mesh numbers MESHNO and stores them at data[MESHNO].

At step S23, the CPU determines the average gradient in X direction SUBG#E and the average gradient in Y direction SUBG#N by calculating the equations as follows:

$$SUBG\#E=(htSE-htSW+htNE-htNW)/2LEN \qquad (10),$$

$$SUBG\#N=(htNW-htSW+htNE-htSE)/2LEN \qquad (11).$$

At step S24, the CPU determines a road gradient θ in the direction of vehicle's travel by calculating the equation as follows:

$$\tan \theta=(SUBG\#E \times \cos\zeta)+(SUBG\#N \times \sin\zeta) \qquad (12).$$

At step S25, the CPU determines RESTRQ by calculating the equation as follows:

$$RESTRQ=WV \times \sin\theta \times 9.8 \times rTIRE \times zRATIO \qquad (13).$$

In the preceding description of the first and second preferred implementations, the target value tTd#n has been expressed in terms of the vehicle driving force. This target value tTd#n may be a predetermined parameter indicative of the vehicle driving force. Examples of the predetermined parameter are driving wheel shaft torque and transmission output shaft torque.

If tTd#n is a target value of the driving wheel shaft torque, TADDFD and ADDFDLM are expressed in terms of torque on the driving wheel shaft. In this case, TADDFD can be expressed as $$TADDFD=0.5 \times RESTRQ/rTIRE \qquad (9').$$

The target engine torque tTe can be expressed as $$tTe=tTd \times zRATIO \div RATIO \qquad (8').$$

If tTd#n is a target value of the transmission outputI shaft torque, TADDFD and ADDFDLM are expressed in terms of torque on the transmission output shaft. In this case, TADDFD can be expressed as $$TADDFD=0.5 \times RESTRQ \qquad (9").$$

The target engine torque tTe can be expressed as $$tTe=tTd \div RATIO \qquad (8").$$

In the preceding description, both the engine torque and the ratio are controlled based on tTd to accomplish the driving force expressed by tTd. The manner of accomplishing tTd is not limited to this example. It is possible to control the engine torque based on tTd and to control the ratio without any reference to tTd.

In the preceding description on the first and second preferred implementations, the running resistance increment generator (RRIG) 2 is described in connection with FIG. 2. For full understanding of the RRIG 2, reference should be made to a pending U.S. patent application Ser. No. 09/518,691, filed Mar. 3, 2000, entitled "Process of Forming Standard Resistance Values and Vehicle Control Using Same", and claims priority based on Japanese Patent Application No. 11-58291 filed in Japan on Mar. 5, 1999. This pending United States Patent Application is hereby incorporated by reference in its entirety and commonly assigned herewith. Particular reference is made to FIG. 2 illustrating a driving torque generator (DTG) 2, a standard resistance generator 3, and a summation point to make subtraction of RLDTRQ from TRQALL to give RESTRQ.

This United States Patent Application, which has been incorporated by reference, has a corresponding European Patent Application that claims priority based on Japanese Patent Application No. 11-58291.

While the present invention has been particularly described, in conjunction with the preferred implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-103693, filed Apr. 12, 1999 is hereby incorporated by reference in its entirety.

What is claimed is:

1. A driving force control system for an automotive vehicle powertrain including a prime mover and an automatic transmission, the driving force control system comprising:
   a first sensor to detect the vehicle's operator demand on driving force to drive the vehicle;
   a second sensor to detect a predetermined parameter indicative of vehicle speed of the vehicle; and
   a microprocessor that is programmed to be operative
   to determine a target value indicative of driving force in response to the vehicle's operator demand on driving force and the vehicle speed,
   to determine a running resistance increment,
   to determine a driving force correction in response to the vehicle's operator demand on driving force and the determined running resistance increment, and
   to correct the determined target value with the determined driving force correction.

2. The driving force control system as claimed in claim 1, wherein said microprocessor is further programmed to be operative
   to determine a preliminary driving force correction in response to the determined running resistance increment, and
   to determine the driving force correction in response to the vehicle's operator demand on driving force and the determined preliminary driving force correction.

3. The driving force control system as claimed in claim 2, wherein the microprocessor is further programmed to be operative
   to determine a driving force correction upper limit in response to the vehicle's operator demand on driving force, and
   to select a lower one of the determined preliminary driving force correction and the determined driving force correction upper limit as the driving force correction.

4. The driving force control system as claimed in claim 3, wherein said microprocessor is further programmed to be operative
   to set the driving force correction upper limit at a value correspondingly small to the vehicle's operator depression demand on driving force as the vehicle's operator demand on driving force becomes small.

5. The driving force control system as claimed in claim 4, wherein said microprocessor is further programmed to be operative
   to set the driving force correction upper limit to zero when the vehicle's operator demand on driving force is in the neighborhood of zero.

6. The driving force control system as claimed in claim 4, wherein said microprocessor is further programmed to be operative
   to hold the driving force correction upper limit to a predetermined maximum value when the vehicle's operator demand on driving force is greater than a predetermined value.

7. The driving force control system as claimed in claim 2, wherein said microprocessor is further programmed to be operative
   to determine a correction rate in response to the vehicle's operator demand on driving force, and
   to determine the driving force correction by multiplying the determined preliminary correction with the determined correction rate.

8. The driving force control system as claimed in claim 7, wherein said microprocessor is further programmed to be operative
   to set the correction rate at a value correspondingly small to the vehicle's operator demand on driving force as the vehicle's operator demand on driving force becomes small.

9. The driving force control system as claimed in claim 8, wherein said microprocessor is further programmed to be operative
   to set the correction rate to zero when the vehicle's operator demand on driving force is in the neighborhood of zero.

10. The driving force control system as claimed in claim 8, wherein said microprocessor is further programmed to be operative
    to hold the correction rate to one when the vehicle's operator demand on driving force is greater than a predetermined value.

11. The driving force control system as claimed in claim 2, wherein said microprocessor is further programmed to be operative
    to set the preliminary driving force correction to zero when the running resistance increment is less than a first predetermined value,
    to hold the preliminary driving force correction to a maximum when the running resistance increment is greater than a second predetermined value that is greater than the first predetermined value, and
    to set around 50 percent of the running resistance increment as the preliminary driving force correction when the running resistance increment is not less than the first predetermined value and not greater than the second predetermined value.

12. The driving force control system as claimed in claim 1, wherein said microprocessor is further programmed to be operative to determine a standard running resistance in response to the vehicle speed, to determine the output torque of the prime mover in response to operation parameters of the prime mover, to determine a driving torque in response to the determined output torque of the prime mover and operation state of the automatic transmission;

to determine an acceleration resistance in response to acceleration to which the vehicle is subject, and to determine the running resistance increment by subtracting a sum of the acceleration resistance and the standard resistance from the determined driving torque.

13. The driving force control system as claimed in claim 1, further comprising:

a memory storing a digital map including altitude information; and a receiver to determine vehicle's location, and wherein said microprocessor is further programmed to be operative to determine a road gradient in response to the determined vehicle's location and the altitude information included by the digital map, and to determine the running resistance increment in response to the determined road gradient.

14. The driving force control system as claimed in claim 1, wherein the target value indicative of driving force exhibits vehicle driving force needed to accomplish a desired traveling performance of the vehicle on a flat road having 0% gradient.

15. The driving force control system as claimed in claim 1, wherein the standard running resistance exhibits a resistance against which the vehicle keeps on rolling on a flat road.

16. The driving force control system as claimed in claim 1, wherein said microprocessor is further programmed to be operative to control an operating parameter of the prime mover related to torque produced by the prime mover in response to the target value as corrected and a ratio within the automatic transmission.

17. The driving force control system as claimed in claim 16, wherein said microprocessor is further programmed to be operative to control the ratio within the automatic transmission in response to the target value as corrected and the vehicle speed.

* * * * *